United States Patent
Hummer (10) Patent No.: US 11,519,202 B2
(45) Date of Patent: Dec. 6, 2022

(54) PASSENGER DOOR LOCK FOR DROP-DOWN STYLE DOORS ON AN AIRCRAFT

(71) Applicant: The Boeing Company, Chicago, IL (US)

(72) Inventor: David A. Hummer, Everett, WA (US)

(73) Assignee: The Boeing Company, Chicago, IL (US)

( * ) Notice: Subject to any disclaimer, the term of this patent is extended or adjusted under 35 U.S.C. 154(b) by 207 days.

(21) Appl. No.: 16/896,996

(22) Filed: Jun. 9, 2020

(65) Prior Publication Data

US 2021/0381285 A1 Dec. 9, 2021

(51) Int. Cl.
| | |
|---|---|
| *E05B 79/06* | (2014.01) |
| *B64C 1/14* | (2006.01) |
| *E05B 77/30* | (2014.01) |
| *E05B 63/00* | (2006.01) |
| *E05B 1/00* | (2006.01) |
| *E05B 83/36* | (2014.01) |

(52) U.S. Cl.
CPC ............. *E05B 79/06* (2013.01); *B64C 1/143* (2013.01); *B64C 1/1407* (2013.01); *E05B 63/0013* (2013.01); *E05B 77/30* (2013.01); *E05B 1/003* (2013.01); *E05B 83/36* (2013.01)

(58) Field of Classification Search
CPC ...... E05B 79/06; E05B 63/0013; E05B 77/30; E05B 1/003; E05B 83/36; E05B 85/10; E05B 85/14; E05B 7/00; B64C 1/143; B64C 1/1423; B64C 1/1469; B64C 1/1407; B64C 1/1461; B64C 1/14
USPC ........................ 292/336.3, 48, 223, 233, 196
See application file for complete search history.

(56) References Cited

U.S. PATENT DOCUMENTS

| | | | | |
|---|---|---|---|---|
| 3,791,073 A | * | 2/1974 | Baker | B64C 1/1407 49/40 |
| 5,031,863 A | * | 7/1991 | Noble | B64C 1/1407 D12/345 |
| 5,305,969 A | * | 4/1994 | Odell | B64C 1/1407 292/259 R |

FOREIGN PATENT DOCUMENTS

| | | | | |
|---|---|---|---|---|
| CN | 106314756 B | | 10/2018 | |
| CN | 111287583 A | * | 6/2020 | ........... B64C 1/1423 |
| EP | 3312082 A1 | | 4/2018 | |

(Continued)

OTHER PUBLICATIONS

European Patent Office; Extended Search Report for Application No. 21174062.6 dated Nov. 10, 2021.

*Primary Examiner* — Kristina R Fulton
*Assistant Examiner* — Tal Saif
(74) *Attorney, Agent, or Firm* — Parsons Behle & Latimer (57) ABSTRACT

Apparatus, systems, and methods for selectively locking and unlocking a passenger door. The apparatus includes a first shaft, having a first longitudinal centerline, and a member, connected to the first shaft. A handle is connected to the first shaft via the member, the handle being movable via rotation of the first shaft from a locked position and an unlocked position. A first protrusion extends from the handle and a latch crank is connected to the second shaft. A second protrusion extends from the latch crank and a linkage is connected between the latch crank and the member. When the handle in the locked position, the first protrusion is positioned adjacent to the second protrusion to prevent rotation of the second shaft. When the handle is in the unlocked position, the first protrusion is positioned away from the second protrusion to enable the second shaft to rotate.

20 Claims, 6 Drawing Sheets

(56) References Cited

FOREIGN PATENT DOCUMENTS

| | | | | |
|---|---|---|---|---|
| FR | 2686568 | A1 * | 7/1993 | ........... B64C 1/1407 |
| FR | 2686568 | A1 | 7/1993 | |
| FR | 2772338 | A1 * | 6/1999 | ........... B64C 1/1407 |

* cited by examiner

PASSENGER DOOR LOCK FOR DROP-DOWN STYLE DOORS ON AN AIRCRAFT

FIELD OF THE DISCLOSURE

The examples described herein relate to apparatus, systems, and methods for selectively locking and unlocking a door, and more particularly a passenger door.

BACKGROUND

Description of the Related Art

A door typically includes a mechanism to open and close the door and may also include a mechanism to lock the door. In some instances, the same mechanism may be used to both operate the door as well as selectively lock the door. In some applications, such as passenger doors for aircraft, there may be limited space for the mechanism to open and close the door as well as selectively lock and unlock the door. It may be very important to ensure that the door is locked when closed in some applications, such as passenger doors in an aircraft. Current aircraft passenger door locking apparatus are complex. One current aircraft passenger door locking apparatus includes a separate lock pawl that interfaces with a sector on the latch shaft to prevent the latch shaft from rotating prior to being unlocked. The lock pawl includes single shear pin joints and may exert out of plane loads onto a door structural beam. The operation of the lock pawl may include an inefficient load path. Other disadvantages may exist.

SUMMARY

The present disclosure is directed to apparatus, systems, and methods for selectively locking and unlocking a passenger door.

One example of the present disclosure is a door lock apparatus. The apparatus comprises a first shaft having a first longitudinal centerline and a member connected to the first shaft. The apparatus includes a handle connected to the first shaft via the member, wherein the handle is movable via rotation of the first shaft between a locked position and an unlocked position. The apparatus includes a first cam that extends from the handle and a second shaft having a second longitudinal centerline. The apparatus includes a latch crank connected to the second shaft. The apparatus includes a second cam that extends from the latch crank and a linkage connected between the latch crank and the member. When the handle is in the locked position, the first cam is positioned adjacent to the second cam to prevent rotation of the second shaft. When the handle is in the unlocked position, the first cam is positioned away from the second cam to enable the second shaft to rotate.

The latch crank may pivot about the second longitudinal centerline as it moves between a closed position and an opened position and the handle may pivot about the first longitudinal centerline as it moves between the locked position and the unlocked position. When the handle moves from the locked position to the unlocked position the handle may pivot about the first longitudinal centerline in a first direction. When the handle moves from the unlocked positioned to the locked position the handle may pivot about the first longitudinal centerline in a second direction opposite the first direction.

Movement of the handle from the locked position to the unlocked position may pivot the latch crank about the second longitudinal centerline in the first direction after the movement of the handle has moved the first cam substantially past the second cam. Movement of the handle from the unlocked position to the locked position may pivot the latch crank about the second longitudinal centerline in the second direction. As the handle moves from the unlocked position to the locked position the latch crank may reach the closed position before the handle reaches the locked position. The latch crank may be in the closed position as the first cam rotates past the second cam.

One example of the present disclosure is a system for locking a door. The system includes a first shaft having a first longitudinal centerline and a member connected to the first shaft. The system includes a handle connected to the first shaft via the member, wherein the handle is movable via rotation of the first shaft between a locked position and an unlocked position. The system includes a first protrusion that extends from the handle and a second shaft having a second longitudinal centerline. The system includes a latch crank connected to the second shaft and a second protrusion that extends from the latch crank. The system includes a linkage connected between the latch crank and the member and a door connected to the linkage. When the handle is in the locked position, the first protrusion is positioned adjacent to the second protrusion to prevent rotation of the second shaft. When the handle is in the unlocked position, the first protrusion is positioned away from the second protrusion to enable the second shaft to rotate.

The door may be a passenger door of an aircraft. The movement of the linkage and the latch crank may open the door. The handle in the locked position may prevent movement of the linkage and the latch crank. The latch crank may pivot about the second longitudinal centerline as it moves between a closed position and an open position and the handle may pivot about the first longitudinal centerline as it moves between the locked position and the unlocked position. When the handle moves from the locked position to the unlocked position the handle may pivot about the first longitudinal centerline in a first direction. When the handle moves from the unlocked positioned to the locked position the handle may pivot about the first longitudinal centerline in a second direction opposite the first direction. The movement of the handle from the locked position to the unlocked position may pivot the latch crank about the second longitudinal centerline in the first direction after the movement of the handle has moved the first protrusion substantially past the second protrusion. The movement of the handle from the unlocked position to the locked position may pivot the latch crank about the second longitudinal centerline in the second direction.

One example of the present disclosure is a method for selectively locking and unlocking a door. The method includes coupling a handle to a first shaft via a member, the handle being rotatable about a first longitudinal centerline of the first shaft between a locked position and an unlocked position. The method includes coupling a latch crank to a second shaft, the latch crank being rotatable about a second longitudinal centerline of the second shaft. The method includes coupling a linkage between the latch crank and the member. The method includes coupling the linkage to the door, wherein movement of the linkage opens and closes the door. The method includes preventing rotation of the latch crank about the second longitudinal centerline of the second shaft when the handle is in the locked position.

The method may include positioning a first protrusion on the handle adjacent to a second protrusion on the latch crank when the handle is in the locked position. The handle may be configured to move the first protrusion away from the second protrusion as the handle rotates from the locked position to the unlocked position. The latch crank may be configured to rotate about the second longitudinal centerline of the second shaft from a closed position to an opened position after the first protrusion moves away from the second protrusion. The rotation of the latch crank from the closed position to the opened position may move the linkage to open the door.

While the disclosure is susceptible to various modifications and alternative forms, specific examples have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 1A:
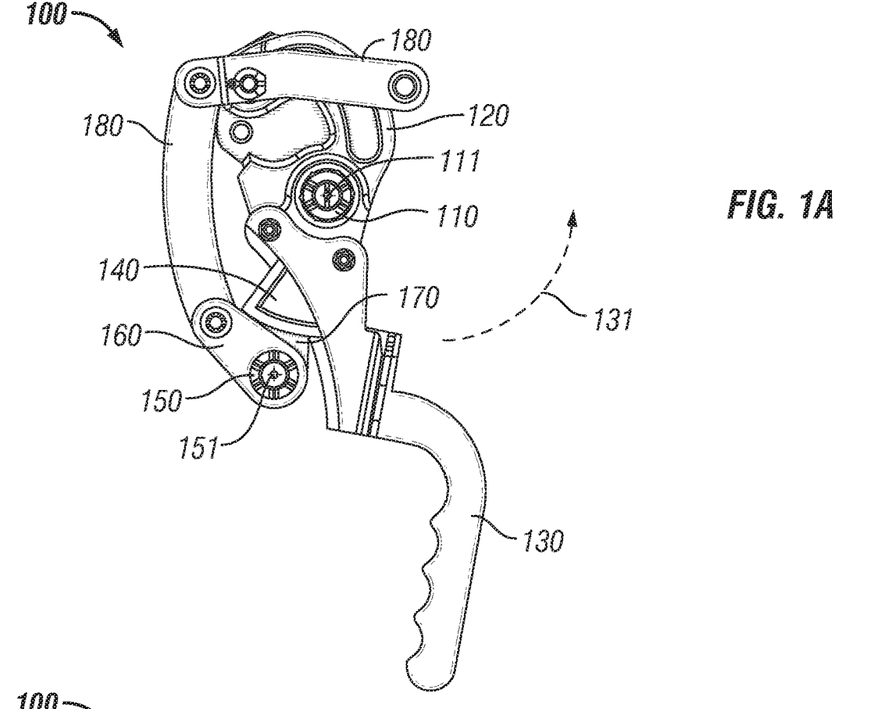
FIGS. 1A-1F are schematics of an example of a door lock apparatus.
Figure 1B:
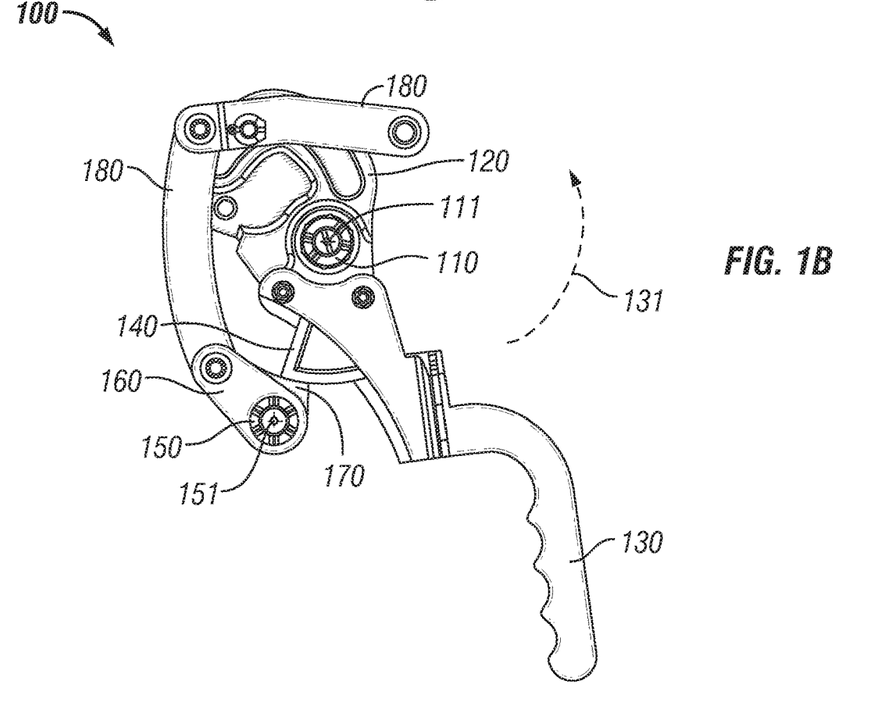
Figure 1C:
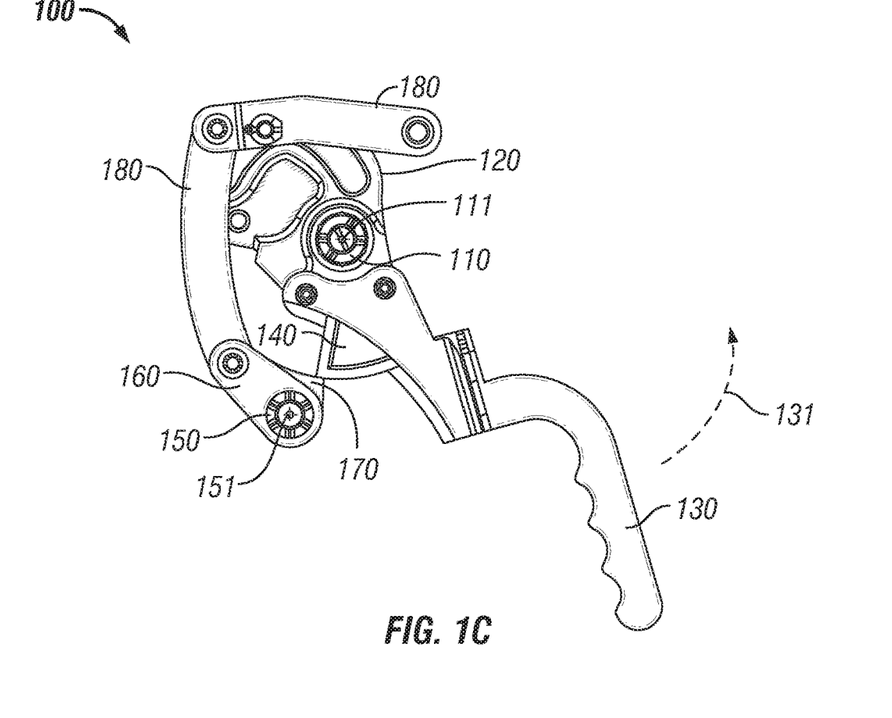
Figure 1D:
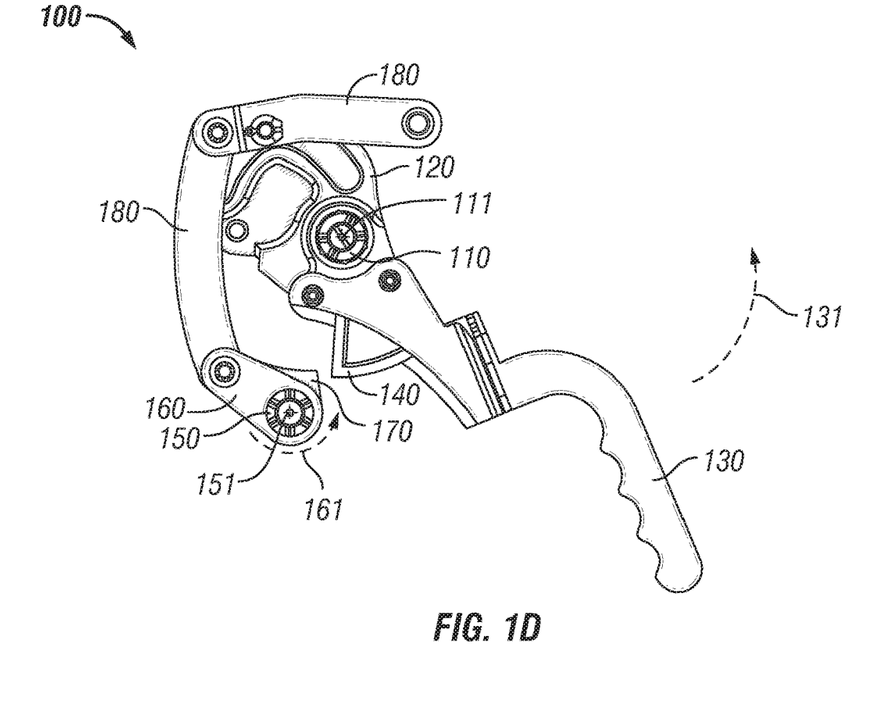
Figure 1E:
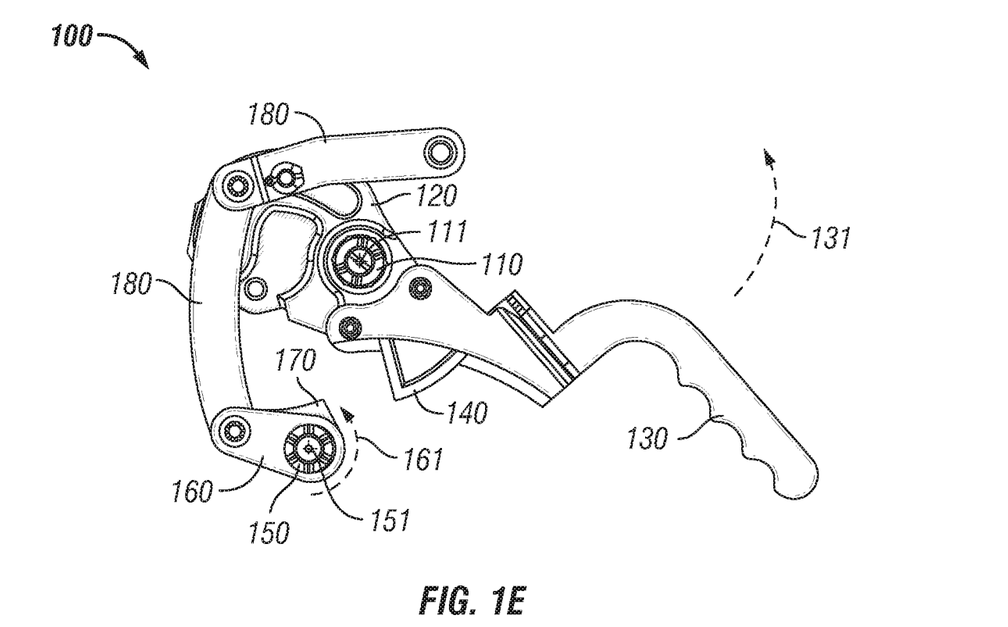
Figure 1F:
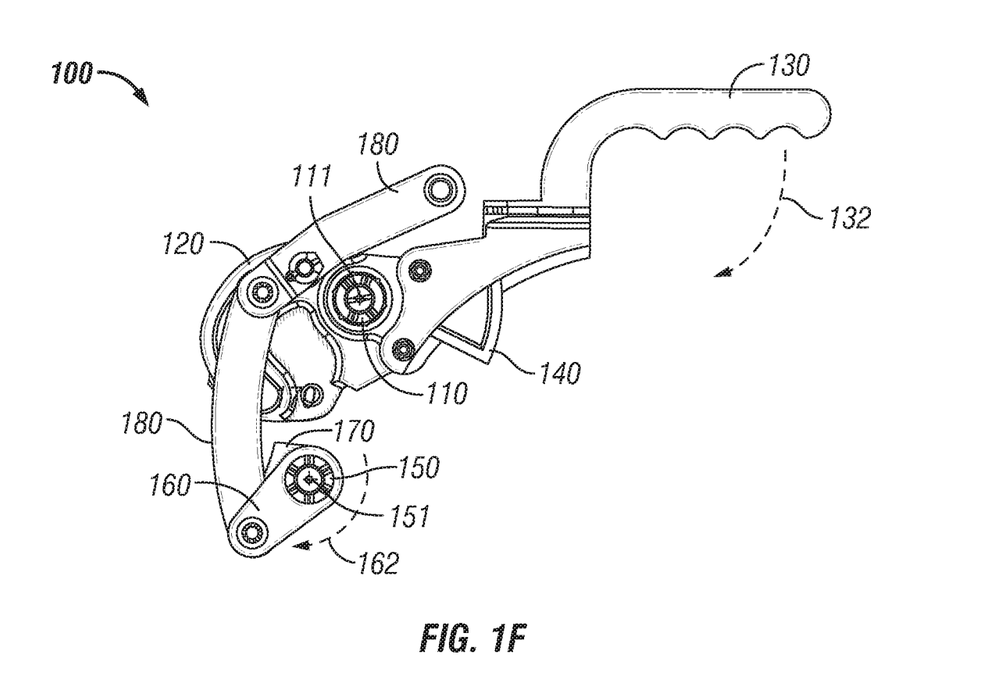

FIGS. 1A-1F are schematics of a door lock apparatus 100. The door lock apparatus 100 includes a first shaft 110 having a first longitudinal centerline 111 and a member 120 connected to the first shaft 110. The door lock apparatus 100 includes a handle 130 connected to the first shaft 110 via the member 120, wherein the handle 130 is movable via rotation of the first shaft 110 between a locked position and an unlocked position. FIG. 1A shows the handle 130 in the locked position and FIG. 1D shows the handle in the unlocked position. FIGS. 1B and 1C show the handle 130 at various positions between the locked position of FIG. 1A and the unlocked position of FIG. 1D. FIGS. 1E and 1F show the handle 130 moved via rotation of the first shaft 110 beyond the unlocked position of FIG. 1D.

The door lock apparatus 100 includes a first cam, or protrusion, 140 that extends from the handle 130 and a second shaft 150 having a second longitudinal centerline 151. The door lock apparatus 100 includes a latch crank 160 connected to the second shaft 150. The door lock apparatus 100 includes a second cam, or protrusion, 170 that extends from the latch crank 160 and a linkage 180 connected between the latch crank 160 and the member 120. When the handle 130 is in the locked position shown in FIG. 1A, the first cam 140 is positioned adjacent to the second cam 170 to prevent rotation of the second shaft 150. When the handle 130 is in the unlocked position shown in FIG. 1D, the first cam 140 is positioned away from the second cam 170 to enable the second shaft 150 to rotate.

The latch crank 160 pivots about the second longitudinal centerline 151 as it moves between a closed position shown in FIG. 1A and an opened position shown in FIG. 1F. The handle 130 pivots about the first longitudinal centerline 111 as it moves between the locked position and the unlocked position. When the handle 130 moves from the locked position to the unlocked position the handle 130 pivots about the first longitudinal centerline 111 in a first direction shown by arrow 131. When the handle 130 moves from the unlocked positioned to the locked position the handle 130 may pivot about the first longitudinal centerline 111 in a second direction indicated by arrow 132 opposite the first direction 131.

Movement of the handle 130 from the locked position to the unlocked position pivots the latch crank 160 about the second longitudinal centerline 151 in the first direction shown by arrow 161 after the movement of the handle 130 has moved the first cam 140 substantially past the second cam 170 as shown in FIGS. 1D-1F. The movement of the handle 130 from the unlocked position to the locked position causes movement of the linkage 180 due to the pivoting of the latch crank 160 about the second longitudinal centerline 151 after the movement of the handle 130 as moved the first cam 140 substantially away from the second cam 170. The linkage 180 is connected to a door with the movement of the linkage 180 configured to open and close the door. The door may be a passenger door on an aircraft.

Movement of the handle 130 from the unlocked position to the locked position pivots the latch crank 160 about the second longitudinal centerline 151 in the second direction as indicated by arrow 162. As the handle 130 moves from the unlocked position to the locked position the latch crank 160 reaches the closed position before the handle 130 reaches the locked position as shown in FIG. 1C. The latch crank 160 is in the closed position as the first cam 140 rotates past the second cam 170 shown in FIGS. 1A-1C. The movement of the handle 130 from the position shown in FIG. 1F to the position shown in FIG. 1C causes the movement of the linkage 180 due to the pivoting of the latch crank 160 in the second direction. The movement of the linkage 180 causes the closing of the door attached to the linkage 180. The handle 130 may continue to move in the second direction from the position shown in FIG. 1C to the locked position shown in FIG. 1A to position the first cam 140 adjacent to the second cam 170. In the locked position, the first cam 140 prevents the rotation of the latch crank 160 connected to the second cam 170 about the second longitudinal centerline 151 of the second shaft 150.

Figure 2:
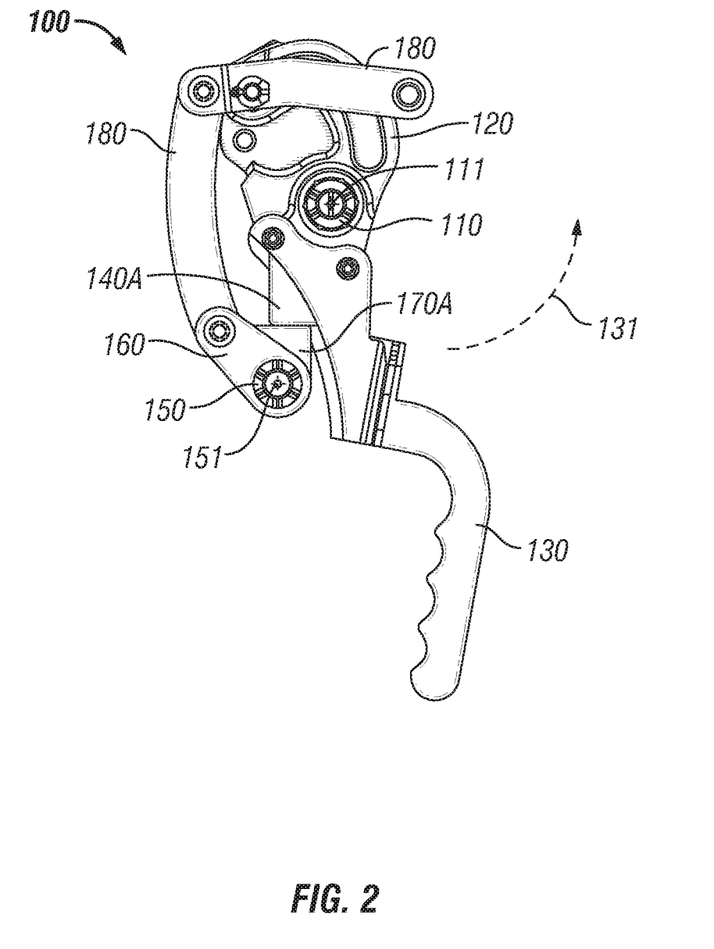
FIG. 2 is a schematic of an example of a door lock apparatus

The shape, size, configuration, and/or location of the first protrusion, or first cam, 140 and the second protrusion, or second cam, 170 may be varied depending on the application as would be appreciated by one of ordinary skill in the art having the benefit of this disclosure. For example, FIG. 2 shows a door lock apparatus 100 includes a first shaft 110 having a first longitudinal centerline 111 and a member 120 connected to the first shaft 110. The door lock apparatus 100 includes a handle 130 connected to the first shaft 110 via the member 120, wherein the handle 130 is movable via rotation of the first shaft 110 between a locked position and an unlocked position.

The door lock apparatus 100 includes a first protrusion 140A that extends from the handle 130 and a second shaft 150 having a second longitudinal centerline 151. The door lock apparatus 100 includes a latch crank 160 connected to the second shaft 150. The door lock apparatus 100 includes a second protrusion 170A that extends from the latch crank 160 and a linkage 180 connected between the latch crank 160 and the member 120. When the handle 130 is in the locked position shown in FIG. 2, the first protrusion 140A is positioned adjacent to the second protrusion 170A to prevent rotation of the second shaft 150. As with the door lock apparatus shown in FIGS. 1A-1F, when the handle 130 is moved to an unlocked position, the first protrusion 140A is positioned away from the second protrusion 170A to enable the second shaft 150 to rotate. The rotation of the second shaft 150 enable a door attached to the door lock apparatus 100 to be opened disclosed herein.

Figure 3:
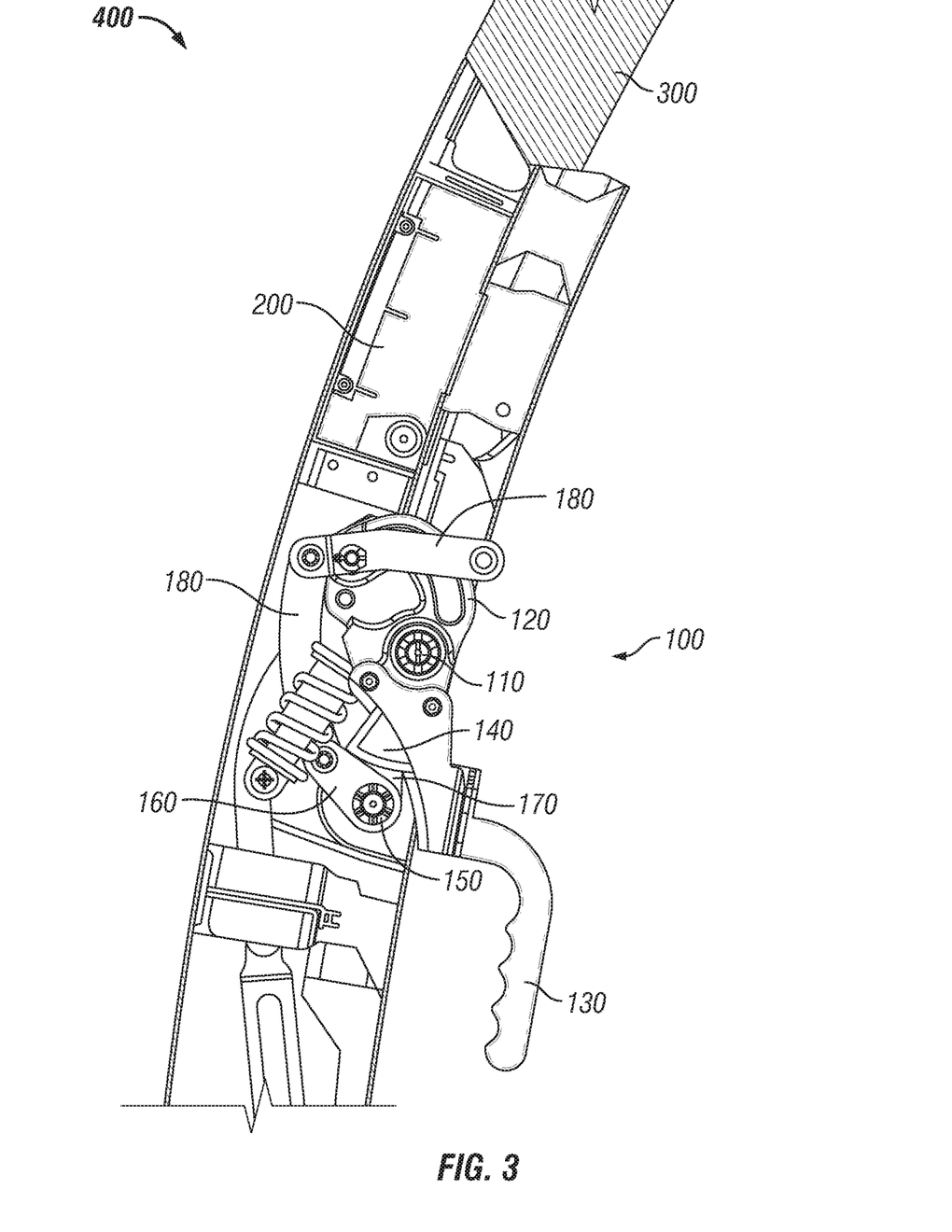
FIG. 3 is a schematic of an example system for selectively locking, unlocking, and opening a door.

FIG. 3 shows a system 400 that includes the door lock apparatus 100 connected to a door 200. The door 200 is a passenger door of an aircraft positioned within the fuselage 300 of the aircraft. The linkage 180 of the door lock apparatus 100 is connected to the door 200. With the handle 130 in the locked position, the first protrusion 140 prevents the rotation of the latch crank 160 by being positioned adjacent to the second protrusion 170 as discussed herein. The handle 130 may be rotated to move the first protrusion 140 with respect to the second protrusion 170 as discussed herein. Once the first protrusion 140 has moved away from the second protrusion 170, the continued movement of the handle 130 causes the rotation of the second shaft 150 moving the linkage 180 to open the door 200.

Figure 4:
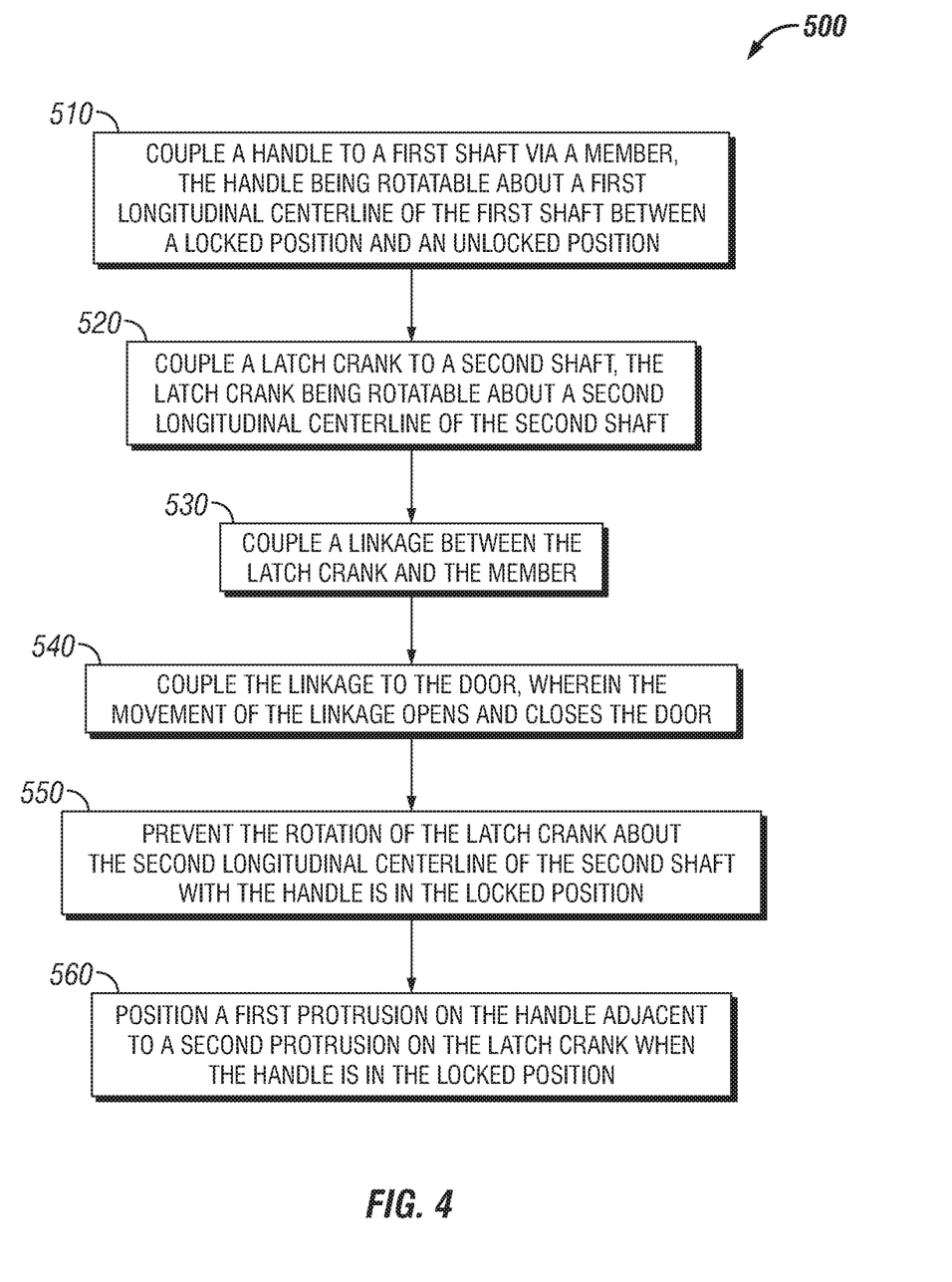
FIG. 4 is a flow chart of an example of a method for selectively locking and unlocking a door.

FIG. 4 is a flow chart for an example method 500 for selectively locking and unlocking a door. The method 500 includes coupling a handle to a first shaft via a member, the handle being rotatable about a first longitudinal centerline of the first shaft between a locked position and a locked position, at 510. For example, a handle 130 is coupled to a first shaft 110 via a member 120. The handle 130 may be moved between a locked position and an unlocked position by rotation of the first shaft 110. The method 500 includes coupling a latch crank to a second shaft, the latch crank being rotatable about a second longitudinal centerline of the second shaft, at 520. For example, a latch crank 160 may be coupled to a second shaft 150 with the latch crank 160 being rotatable about a second longitudinal centerline 151 of the second shaft 150.

The method 500 includes coupling a linkage between the latch crank and the member, at 530. For example, a linkage 180 may be coupled between a latch crank 160 and a member 120. The method 500 includes coupling the linkage to a door, wherein the movement of the linkage opens and closes the door, at 540. The door may be, but is not limited to, a passenger door of an aircraft. The method 500 includes preventing rotation of the latch crank about second longitudinal centerline of the second shaft when the handle is in the locked position, at 550. The method 500 may include positioning a first protrusion on the handle adjacent to a second protrusion on the latch crank when the handle is in the locked position, at 560. For example, a first protrusion 140 on the handle 130 may be positioned adjacent to a second protrusion 170 on the latch crank 160 to prevent rotation of the latch crank 160 about the second longitudinal centerline 151 of the second shaft 150.

Although this disclosure has been described in terms of certain examples, other examples that are apparent to those of ordinary skill in the art, including examples that do not provide all of the features and advantages set forth herein, are also within the scope of this disclosure. Accordingly, the scope of the present disclosure is defined only by reference to the appended claims and equivalents thereof.

What is claimed is:

1. A door lock apparatus comprising:
a first shaft having a first longitudinal centerline;
a member connected to the first shaft;
a handle connected to the first shaft via the member, wherein the handle is movable via rotation of the first shaft between a locked position and an unlocked position;
a first cam that extends from the handle;
a second shaft having a second longitudinal centerline;
a latch crank connected to the second shaft;
a second cam that extends from the latch crank; and
a linkage connected between the latch crank and the member;
wherein when the handle is in the locked position, the first cam is positioned adjacent to the second cam to prevent rotation of the second shaft;
wherein when the handle is in the unlocked position, the first cam is positioned away from the second cam to enable the second shaft to rotate;
wherein the latch crank pivots about the second longitudinal centerline as it moves between a closed position and an opened position, and wherein the handle pivots about the first longitudinal centerline as it moves between the locked position and the unlocked position; and
wherein as the handle moves from the unlocked position to the locked position, the latch crank reaches the closed position before the handle reaches the locked position.

2. The door lock apparatus of claim 1, wherein, when the handle moves from the locked position to the unlocked position, the handle pivots about the first longitudinal centerline in a first direction.

3. The door lock apparatus of claim 2, wherein when the handle moves from the unlocked position to the locked position, the handle pivots about the first longitudinal centerline in a second direction opposite the first direction.

4. The door lock apparatus of claim 3, wherein movement of the handle from the locked position to the unlocked position pivots the latch crank about the second longitudinal centerline in a first direction after the movement of the handle has moved the first cam substantially past the second cam.

5. The door lock apparatus of claim 4, wherein movement of the handle from the unlocked position to the locked position pivots the latch crank about the second longitudinal centerline in a second direction.

6. The door lock apparatus of claim 5, wherein the latch crank is in the closed position as the first cam rotates past the second cam.

7. A system for locking a door, the system comprising:
a first shaft having a first longitudinal centerline;
a member connected to the first shaft;
a handle connected to the first shaft via the member, wherein the handle is movable via rotation of the first shaft between a locked position and an unlocked position;
a first protrusion that extends from the handle;
a second shaft having a second longitudinal centerline;
a latch crank connected to the second shaft;
a second protrusion that extends from the latch crank; and
a linkage connected between the latch crank and the member, wherein the door is connected to the linkage;
wherein when the handle is in the locked position, the first protrusion is positioned adjacent to the second protrusion to prevent rotation of the second shaft;
wherein when the handle is in the unlocked position, the first protrusion is positioned away from the second protrusion to enable the second shaft to rotate;
wherein the latch crank pivots about the second longitudinal centerline as it moves between a closed position and an open position, and wherein the handle pivots about the first longitudinal centerline as it moves between the locked position and the unlocked position; and wherein as the handle moves from the unlocked position to the locked position, the latch crank reaches the closed position before the handle reaches the locked position.

8. The system of claim 7, wherein the door is a passenger door of an aircraft.

9. The system of claim 8, wherein movement of the linkage and the latch crank opens the door.

10. The system of claim 9, wherein the handle in the locked position prevents movement of the linkage and the latch crank.

11. The system of claim 10, wherein when the handle moves from the locked position to the unlocked position, the handle pivots about the first longitudinal centerline in a first direction, and wherein when the handle moves from the unlocked positioned to the locked position, the handle pivots about the first longitudinal centerline in a second direction opposite the first direction.

12. The system of claim 11, wherein movement of the handle from the locked position to the unlocked position pivots the latch crank about the second longitudinal centerline in a first direction after the movement of the handle has moved the first protrusion substantially past the second protrusion and wherein movement of the handle from the unlocked position to the locked position pivots the latch crank about the second longitudinal centerline in a second direction.

13. A method for selectively locking and unlocking a door, the method comprising steps of:

coupling a handle to a first shaft via a member, the handle being rotatable about a first longitudinal centerline of the first shaft between a locked position and an unlocked position;

coupling a latch crank to a second shaft, the latch crank being rotatable about a second longitudinal centerline of the second shaft as it moves between a closed position and an open position;

coupling a linkage between the latch crank and the member;

coupling the linkage to the door, wherein movement of the linkage opens and closes the door; and preventing rotation of the latch crank about the second longitudinal centerline of the second shaft when the handle is in the locked position; and wherein as the handle moves from the unlocked position to the locked position, the latch crank reaches the closed position before the handle reaches the locked position.

14. The method of claim 13, wherein the step of preventing rotation of the latch crank further comprises positioning a first protrusion on the handle adjacent to a second protrusion on the latch crank when the handle is in the locked position.

15. The method of claim 14, wherein the handle is configured to move the first protrusion away from the second protrusion as the handle rotates from the locked position to the unlocked position.

16. The method of claim 15, wherein the latch crank is configured to rotate about the second longitudinal centerline of the second shaft from a closed position to an opened position after the first protrusion moves away from the second protrusion.

17. The method of claim 16, wherein rotation of the latch crank from the closed position to the opened position moves the linkage to open the door.

18. The system of claim 11, wherein the latch crank is in the closed position as the first protrusion moves past the second protrusion.

19. The door lock apparatus of claim 1, wherein the movement of the linkage and the latch crank opens a door.

20. The door lock apparatus of claim 19, wherein the door is a passenger door of an aircraft.

* * * * *